UNITED STATES PATENT OFFICE.

RUDOLF MAAG, OF SINDLINGEN, NEAR HÖCHST-ON-THE-MAIN, AND PAUL JÖRG, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BENZOQUINONE DERIVATIVES AND PROCESS OF MAKING SAME.

1,065,063.          Specification of Letters Patent.          Patented June 17, 1913.

No Drawing.    Application filed May 1, 1912, Serial No. 694,542.    Renewed March 1, 1913.    Serial No. 751,646.

*To all whom it may concern:*

Be it known that we, RUDOLF MAAG, Ph. D., chemist, and PAUL JÖRG, Ph. D., chemist, citizens of the Swiss Republic and the German Empire, respectively, residing at Sindlingen, near Höchst-on-the-Main, and Höchst-on-the-Main, Germany, respectively, have invented certain new and useful Improvements in Benzoquinone Derivatives and Processes of Making Same, of which the following is a specification.

We have found that by heating the diarylamino derivatives of halogenized benzoquinones corresponding to the constitutional formula:

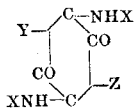

wherein "X" stands for a benzene residue which may be substituted, and "Y" and "Z" for a halogen, one of which may be replaced by hydrogen, they are transformed into new compounds probably constituting derivatives of the triphendioxazin.

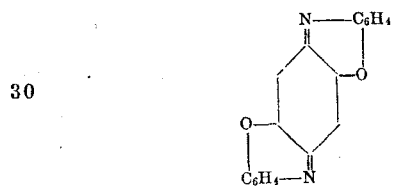

The heating is advantageously effected in a solvent of a high boiling point and in presence of a metal halogenid. When triturated, they form reddish-brown powders, crystallizing with a bronze luster; they are insoluble in water and alcohol, soluble in concentrated sulfuric acid with a blue color, in boiling xylene with an intense yellow fluorescence. They are of great value as pigment dyes.

Example: 15 parts of di-(p-phenetidino-)di-chlorobenzoquinone obtainable by boiling in an alcoholic solution chloranil with para-phenetidin, are boiled for 7 hours with 200 parts of nitrobenzene and 10 parts of sublimated ferric chlorid. For isolating the resulting dyestuff, the nitrobenzene may be expelled by steam, whereupon the dyestuff is filtered and washed with water. For preparing it in a pure state, the product after being dried at 120° C. may be recrystallized in nitrobenzene. It then forms small red needles of a green metallic luster, and when triturated forms a red powder. It is insoluble in water and alcohol, soluble in concentrated sulfuric acid with a blue color, in boiling xylene with a yellow fluorescence. Its composition corresponds most probably to the formula:

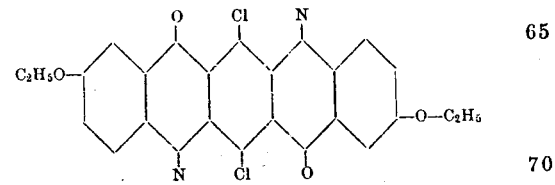

When made up into a pigment dye, it yields beautiful fast bluish-red tints.

Having now described our invention, what we claim is:

1. The process of manufacturing dyestuffs, which consists in heating diarylamino-halogenbenzoquinone derivatives, wherein "aryl" means a benzene residue which may be substituted, in a solvent of high boiling point.

2. The process of manufacturing dyestuffs, which consists in heating diarylamino-halogen-benzoquinone derivatives, wherein "aryl" means a benzene residue which may be substituted, in a solvent of a high boiling point, in the presence of a metal chlorid.

3. The process of manufacturing a dyestuff, which consists in heating di-paraphenetidino-dichlorbenzoquinone with ferric chlorid in nitrobenzene.

4. As new products, the dyestuffs being inner condensation-products of di-arylamino-halogen-benzoquinone derivatives, and very probably being derivatives of the triphendioxazin

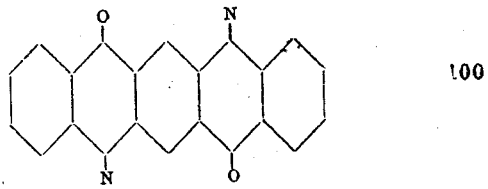

forming red powders, insoluble in water and alcohol, soluble in concentrated sulfuric acid with a blue color and in boiling xylene with a yellow fluorescence.

5. As a new product, the dyestuff being an inner condensation-product of di-paraphenetidino-dichlorbenzoquinone, very probably being a derivative of the triphendioxazin, forming a red powder which when crystallized in nitrobenzene, turns into small red needles of a greenish luster, soluble in concentrated sulfuric acid with a blue color and in boiling xylene with an intense yellow fluorescence.

In testimony whereof, we affix our signatures in presence of two witnesses.

RUDOLF MAAG.
PAUL JÖRG.

Witnesses:
JEAN GRUND,
CARL GRUND.

Copies of this patent may be obtained for five cents each, by addressing the "Commissioner of Patents, Washington, D. C."